United States Patent
Gandhi (10) Patent No.: US 12,395,436 B2
(45) Date of Patent: Aug. 19, 2025

(54) CAPACITY AND PERFORMANCE AWARE LOAD BALANCER SELECTION

(71) Applicant: Microsoft Technology Licensing, LLC, Redmond, WA (US)

(72) Inventor: Rohan Gandhi, Maharashtra (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 22 days.

(21) Appl. No.: 18/479,427

(22) Filed: Oct. 2, 2023

(65) Prior Publication Data

US 2025/0112865 A1 Apr. 3, 2025

(51) Int. Cl.
- *H04L 47/125* (2022.01)
- *H04L 43/0864* (2022.01)
- *H04L 45/12* (2022.01)
- *H04L 45/745* (2022.01)

(52) U.S. Cl.
CPC ........ *H04L 47/125* (2013.01); *H04L 43/0864* (2013.01); *H04L 45/123* (2013.01); *H04L 45/745* (2013.01)

(58) Field of Classification Search
CPC ............... H04L 47/125; H04L 12/4633; H04L 12/4641; H04L 45/04; H04L 45/586; H04L 45/64; H04L 45/66; H04L 45/74; H04L 45/745
See application file for complete search history.

(56) References Cited

U.S. PATENT DOCUMENTS

| | | | | |
|---|---|---|---|---|
| 11,757,983 B1 | * | 9/2023 | Pandey | H04L 67/101 709/226 |
| 2004/0071087 A1 | * | 4/2004 | Siev | H04L 67/1006 370/235 |
| 2010/0302940 A1 | * | 12/2010 | Patel | H04L 45/04 370/230 |
| 2015/0271075 A1 | * | 9/2015 | Zhang | H04L 12/4633 370/235 |
| 2019/0026206 A1 | * | 1/2019 | Harutyunyan | G06F 11/0781 |
| 2019/0220321 A1 | * | 7/2019 | Yang | H04L 41/0896 |
| 2021/0392040 A1 | * | 12/2021 | Kerboeuf | H04L 41/0806 |

(Continued)

OTHER PUBLICATIONS

"Application as Filed in U.S. Appl. No. 18/199,110", filed May 18, 2023, 51 Pages.

(Continued)

*Primary Examiner* — David R Lazaro
(74) *Attorney, Agent, or Firm* — RAY QUINNEY & NEBEKER; Tiffany B. Healy (57) ABSTRACT

The present disclosure relates to methods and systems for providing performance aware MUX selection for traffic in layer-4 load balancing. The methods and systems assign a subset of VIP ranges (VIP shards) to a subset of MUXes based on capacity of the MUXes. The methods and systems allow sources (end-hosts) in the same datacenter (DC) to select the MUXes for intra-DC traffic. The methods and systems allow the sources to use weights calculated by a controller for splitting the traffic across MUXes based on an end-to-end latency of the MUXes. The methods and systems allow the sources to know the MUXes handling the traffic by using packet modification and allow the MUXes to route the packets to reach specific MUXes.

19 Claims, 9 Drawing Sheets

(56) References Cited

U.S. PATENT DOCUMENTS

2024/0406101 A1* 12/2024 Hawari .................. H04L 45/74
2025/0112865 A1* 4/2025 Gandhi ................ H04L 45/123

OTHER PUBLICATIONS

Eisenbud, et al., "Maglev: A fast and reliable software network load balancer", In Proceedings of 13th USENIX Symposium on Networked Systems Design and Implementation, Mar. 16, 2016, 523-535.

Kalia, et al., "Datacenter RPCs can be General and Fast", In Proceedings of 16th USENIX Symposium on Networked Systems Design and Implementation, Feb. 26, 2019, pp. 1-17.

Manousis, et al., "Contention-aware performance prediction for virtualized network functions", In Proceedings of the Annual conference of the ACM Special Interest Group on Data Communication on the applications, technologies, architectures, and protocols for computer communication, Aug. 10, 2020, 13 Pages.

Tootoonchian, et al., "Resq: Enabling slos in network function virtualization", In Proceedings of the 15th USENIX Symposium on Networked Systems Design and Implementation, Apr. 9, 2018, pp. 283-297.

\* cited by examiner

CAPACITY AND PERFORMANCE AWARE LOAD BALANCER SELECTION

BACKGROUND

A layer-4 load balancer (LB) is one of the foundational blocks for online services. Online services expose small number of virtual addresses (VIPs) to receive the traffic. Internally, the layer-4 LB runs on many virtual machines (VMs) with their own unique direct IPs (DIPs). The layer-4 LB receives the traffic on VIPs and splits it across DIPs.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes determining a plurality of virtual IP (VIP) shards for a VIP range for a datacenter, wherein each VIP shard is a subset of the VIP range. The method includes assigning each VIP shard of the plurality of VIP shards to a subset of multiplexers (MUXes) of a plurality of MUXes in the datacenter. The method includes providing, to switches in the datacenter, a VIP-MUX mapping with each VIP shard and an assigned subset of MUXes.

Some implementations relate to a device. The device includes a processor; memory in electronic communication with the processor; and instructions stored in the memory, the instructions being executable by the processor to: determine a plurality of virtual IP (VIP) shards for a VIP range for a datacenter, wherein each VIP shard is a subset of the VIP range; assign each VIP shard of the plurality of VIP shards to a subset of multiplexers (MUXes) of a plurality of MUXes in the datacenter; and provide, to switches in the datacenter, a VIP-MUX mapping with each VIP shard and an assigned subset of MUXes.

Some implementations relate to a method. The method includes receiving, from a controller, a virtual IP (VIP)-MUX mapping with each virtual IP (VIP) shard of a plurality of VIP shards assigned to a subset of multiplexers (MUXes) of a plurality of MUXes in a datacenter, wherein each VIP shard is a subset of a VIP range for the datacenter. The method includes receiving, from the controller, a MUX weight for each VIP shard on each MUX in the subset of MUXes. The method includes using, the MUX weight, to distribute traffic for each VIP shard on each MUX in the subset of MUXes.

Some implementations relate to a device. The device includes a processor; memory in electronic communication with the processor; and instructions stored in the memory, the instructions being executable by the processor to: receive, from a controller, a virtual IP (VIP)-MUX mapping with each virtual IP (VIP) shard of a plurality of VIP shards assigned to a subset of multiplexers (MUXes) of a plurality of MUXes in a datacenter, wherein each VIP shard is a subset of a VIP range for the datacenter; receive, from the controller, a MUX weight for each VIP shard on each MUX in the subset of MUXes; and use, the MUX weight, to distribute traffic for each VIP shard on each MUX in the subset of MUXes.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

A layer-4 load balancer (LB) is one of the foundational blocks for online services. Online services expose small number of virtual addresses (VIPs) to receive traffic. The traffic may come from outside services (e.g., Internet traffic) or from clients within a datacenter (DC). Internally, the layer-4 LB runs on many virtual machines (VMs) with their own unique direct IPs (DIPs). The layer-4 LB receives the traffic on VIPs and splits it across DIPs. An online service deploys multiple servers with DIPs, primarily to scale and to provide high availability. The DIPs run behind a load-balancer (LB) that exposes one or more virtual IPs (VIPs) to receive the traffic from outside the service or from clients within a datacenter.

Figure 1:
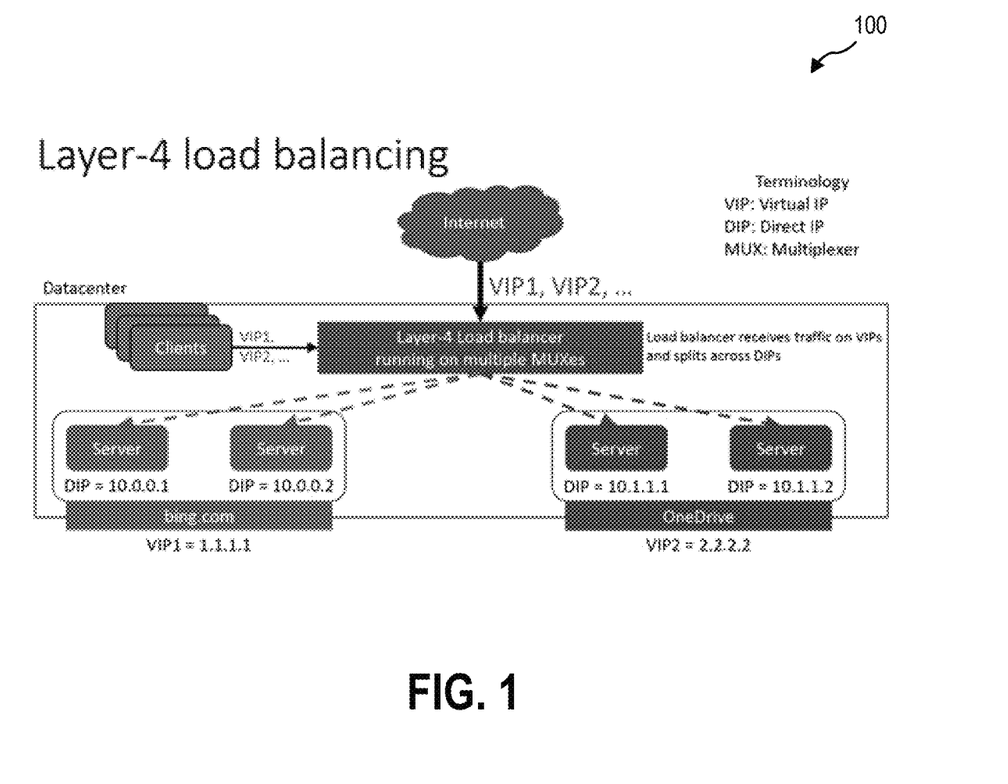
FIG. 1 illustrates an example of an existing layer-4 load balancer system.

FIG. 1 illustrates an example of an existing layer-4 LB system 100 in a datacenter (DC). The layer-4 LB receives the traffic from the Internet for the VIPs (e.g., VIP1 and VIP2) and splits the Internet traffic across the DIPs. The layer-4 LB also receives the traffic from different clients within the datacenter and splits traffic from the clients across the DIPs. There is no single instance of the layer-4 LB. The layer-4 LB runs on multiple instances (called multiplexers (MUXes)). One example is the layer-4 LB runs on hundreds of MUXes in the datacenter. The VIP traffic is split across the MUXes. Each MUX then sends the traffic (the Internet traffic or the traffic from the clients) across DIPs. Existing LB designs assign all VIPs to all MUXes in a datacenter.

Figure 2:
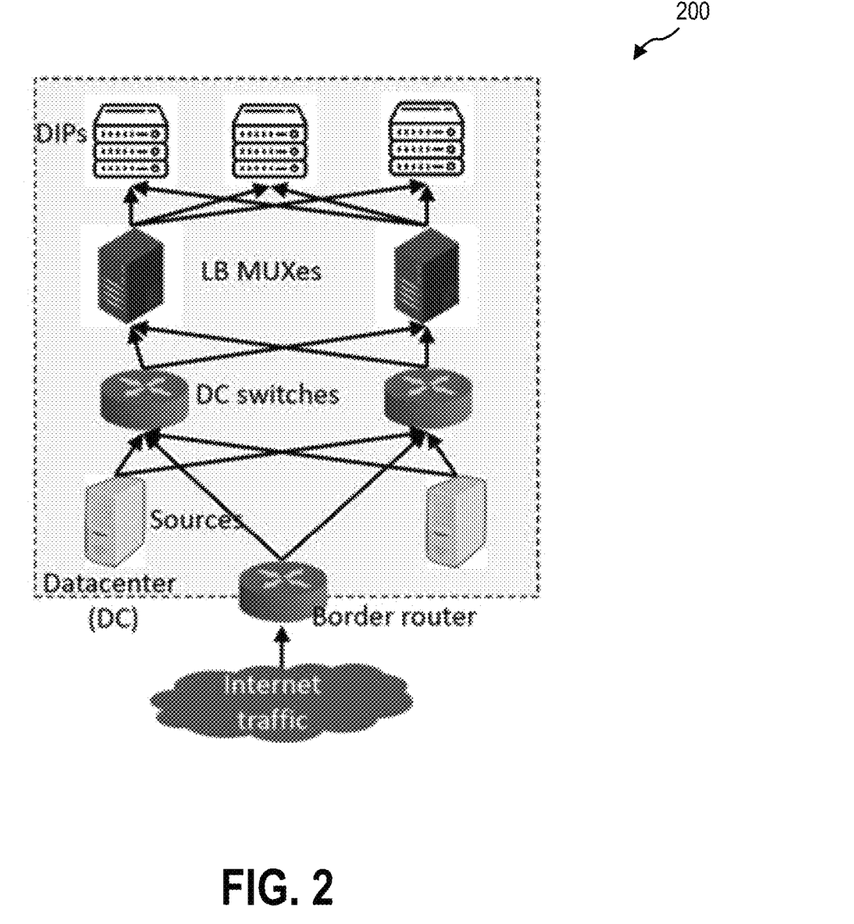
FIG. 2 illustrates an example of logical layers in an existing layer-4 load balancer.

FIG. 2 illustrates an example of logical layers in an existing layer-4 LB system 200. Clients (on the Internet or internally in the same datacenter) sends requests on a VIP. The VIP packet is first intercepted by switches. In existing layer-4 LB designs, network switches select the MUX for traffic in the same datacenter. There may be hundreds of MUXes in a datacenter. The switches select MUXes using ECMP (equal-cost-multi-path) and forward the packet to the selected MUX. The MUXes store a VIP-DIP mapping for all VIPs. The MUXes select DIPs and forward the packet to the DIPs. In existing, LB designs, traffic from each source is split equally among MUXes.

Figure 3:
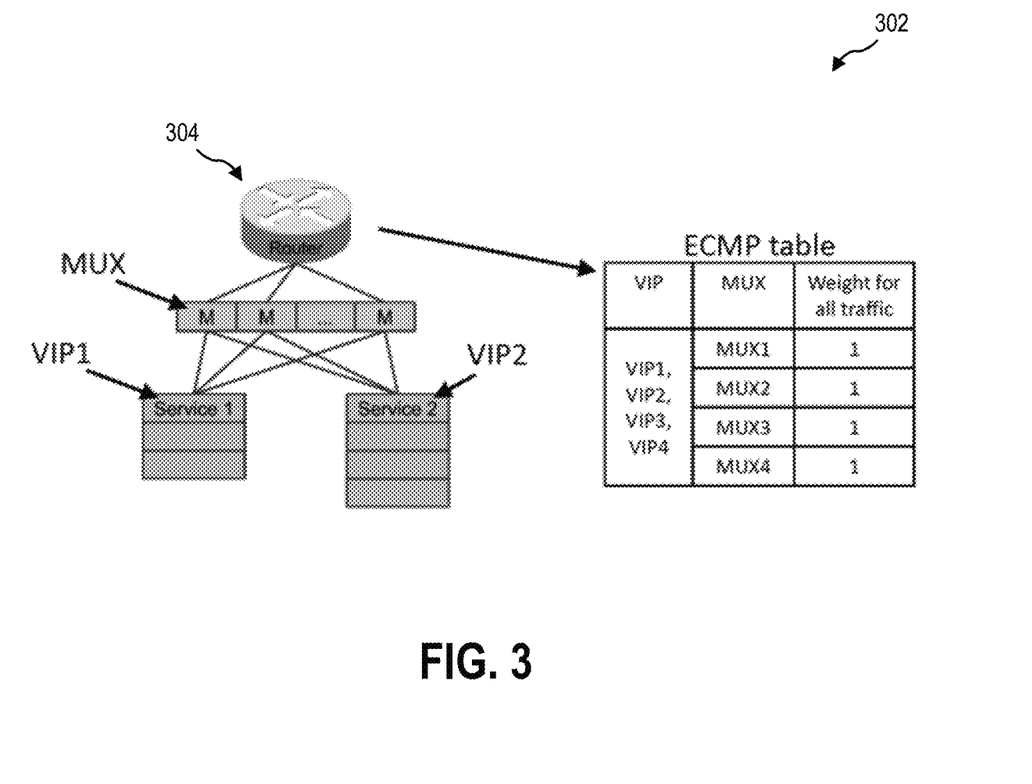
FIG. 3 illustrates an example of MUX selection in an existing layer-4 load balancer.

FIG. 3 illustrates an example of an existing MUX selection in an existing layer-4 LB system (e.g., the layer-4 LB system 100 (FIG. 1) or the layer-4 LB system 200 (FIG. 2)). Each router/switch 304 in a datacenter (DC) has an ECMP table 302 for the entire VIP range. The weight for each MUX is set to "1" and the traffic is uniformly split across all MUXes in the datacenter (DC). In existing LB designs, there is no support for sources to know the MUX handling traffic.

Recent advances in LBs have shown that there are many options for MUXes. For example, the MUXes can run on software instances, or hardware, or FPGAs. Thus, different instances of MUXes can have radically different capacities. The MUXes may be hosted on instances with other applications too raising a noisy-neighbor problem, where the capacity of the MUX can dynamically change. Thus, the MUXes can have different and dynamic capacities.

Existing solutions do not support MUXes of different capacities or cause the size of the ECMP table to increase substantially (e.g., increase by more than ten times the size). Datacenter applications are increasingly becoming latency-sensitive with few microsecond latencies. MUXes impose additional latency through congestion at the MUXes (e.g., MUXes running at high CPU add latency to packet processing), congestion on network paths (e.g., paths leading from source VMs to MUXes can observe congestion), and MUXes are far away (the selected MUXes may be far away from the sources adding to the latency). In existing solutions, the sources in datacenters have no control over MUX selection. As a result, the sources in the datacenters cannot do MUX selection based on the performance.

The present disclosure includes a number of practical applications that provide benefits and/or solve problems associated with layer-4 load balancing. Examples of these applications and benefits are discussed in further detail below.

The methods and systems automatically provide performance aware MUX selection for traffic in layer-4 load balancing. The methods and systems of the present disclosure assign a subset of the VIPs to individual MUXes based on the capacity and traffic of the MUXes. Instead of storing the full VIP range on each MUX, MUXes in the methods and systems of the present invention store a subset of VIP ranges (referred to herein as VIP shards) based on capacity of the MUXes. The VIP range is split across a plurality of VIP shards (e.g., VIP1 shard, VIP2 shard, VIP3 shard, etc.). MUXes with more capacity receive more VIP shards relative to MUXes with less capacity. For example, if MUX2 has more capacity relative to MUX 1, MUX 1 is assigned VIP1 shard and MUX 2 is assigned VIP1 shard and the VIP2 shard).

The methods and systems contain the size of the ECMP table size (e.g., maintaining a current size of the ECMP table or reducing a size of the ECMP table). The methods and systems offload MUX selection to sources in the same datacenter, as opposed to network switches doing such selection (as done in current LB solutions). In the methods and systems of the present disclosure sources measure the latency from each MUX. In some implementations, packet modifications and routing occur to enable sources to measure the latencies from different MUXes. Using the measurements, sources select MUXes using weights. The weights are calculated so that the performance is maximized without exceeding MUX capacities.

The methods and systems of the present disclosure assigns a subset of VIPs to individual MUXes based on capacity and traffic, resulting in an advantage of providing capacity aware MUX selection without exploding the ECMP table size (e.g., without significantly increasing the ECMP table size).

The methods and systems of the present disclosure allow sources (end-hosts) in the same DC to select the MUXes for intra-DC traffic, resulting in an advantage of the sources can select the MUXes in response to the performance of the MUXes. The methods and systems of the present disclosure allow the sources to select the MUXes by monitoring end-to-end latency. The methods and systems of the present disclosure allow the sources to use weights calculated by a controller for splitting the traffic across MUXes, aiding the sources in selecting MUXes with good performance. The methods and systems of the present disclosure allow the sources to know the MUXes handling the traffic by using packet modification and routing changes that comply with today's datacenter networks. The methods and systems allow the sources to route the packets to reach the specific MUXes.

One technical advantage of the methods and systems of the present disclosure include supporting capacity aware MUX selection. Another technical advantage of the methods and systems of the present disclosure is performance aware MUX selection for sources in datacenters. Another technical advantage of the methods and systems of the present disclosure is reducing a size of the ECMP table. Another technical advantage of the methods and systems of the present disclosure is improved performance and operability. Another technical advantage of the methods and systems of the present disclosure is low overhead in terms of cost, deployability, and operability.

Figure 4:
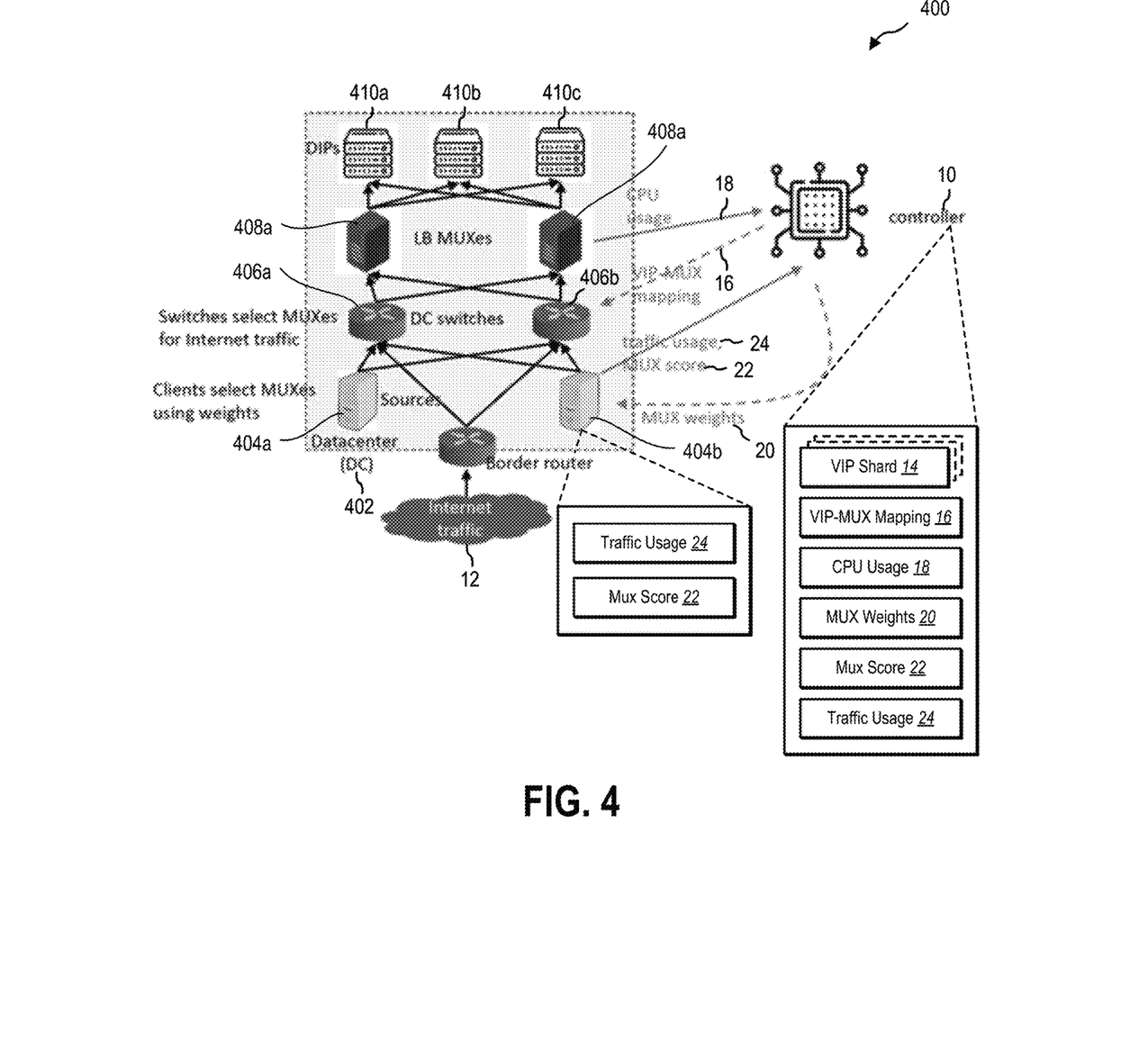
FIG. 4 illustrates an example environment for MUX selection based on MUX capacity in accordance with implementations of the present disclosure.

Referring now to FIG. 4, illustrated is an example environment 400 for selecting MUXes based on MUX capacity in a datacenter 402. The environment 400 includes a controller 10 in communication with the sources 404 (e.g., sources 404a, 404b up to r, where r is a positive integer), the switches 406 (e.g., switches 406a, 406b up to s, where s is a positive integer), and the MUXes 408 (e.g., MUXes 408a, 408b up to m, where m is a positive integer). For example, the datacenter 402 has hundreds of MUXes 408. In some implementations, the controller 10 is a virtual machine or server in the datacenter 402. The switches 406 select the MUXes 408 for the Internet traffic 12 received at the datacenter 402.

The controller 10 breaks the VIP range into multiple VIP shards 14. The VIP range is a fixed block of IP addresses for the datacenter 402. The VIP range is split it across "N" VIP shards 14 (where N is a positive integer). The VIP shards 14 are a subset of the VIPs. In some implementations, N is a power of 2 (e.g., 2, 4, 8, etc.). For example, if the VIP range is 10.0.0.0/14, the VIP range is split into VIP shards 14 of (VIP1 shard) 10.0.0.0/16, (VIP2 shard) 10.1.0.0/16, (VIP3 shard) 10.2.0.0/16, etc. The controller 10 receives the CPU usage 18 of the MUXes 408 and uses the CPU usage 18 to determine a capacity of each MUX 408 (e.g., a capacity of MUX 408a, a capacity of MUX 408b).

The controller 10 uses a VIP-MUX mapping 16 to assign a subset of the VIP shards 14 to the MUXes based on a MUX capacity and the VIP shard 14 traffic. Each VIP shard 14 is assigned to "K" MUXes 408 (where K is a positive integer). For example, a first VIP Shard $14_1$ is assigned to MUX 408a and a second VIP shard $14_2$ is assigned to MUX 408b. In some implementations, the total ECMP table size is equal to N*K. For example, if the datacenter 402 includes 100 MUXes 408, the number (N) of VIP shards 14 is equal to 8 and number (K) of MUXes 408 assigned to each VIP shard 14 is equal 12, the total size of the ECMP table (N*K) is equal to 96, which is less than the total number of MUXes 408 (100) in the datacenter. If N and K are selected so that N*K is less than M, the size of the ECMP table is reduced while still building capacity aware MUX selection.

In some implementations, the controller 10 uses an integer linear program (ILP) for assigning the VIP shards 14 to individual MUXes 408 based on capacity. An objective of the integer linear program is to minimize a maximum CPU usage 18 (CPU load) on each of the MUXes 408 (e.g., minimize y). Constraints of the integer linear program that the controller 10 uses for assigning VIP shards 14 to MUXes 408 are illustrated below in the equations (1), (2), and (3). The constraints include that each VIP shard 14 is assigned to K MUXes 408 (equation (1)), traffic on each MUX 408 is under a capacity of the MUX 408 (equation (2)), and y (the maximum CPU load on each MUX 408) is greater than the CPU load on each MUX 408 (equation (3)).

$$\forall v \in V, \sum_{m \in M} X_v^m = K \quad (1)$$

$$\forall m \in M, \sum_{v \in V} X_v^m * t_v / K * C_v \leq \text{Capacity}_m \quad (2)$$

$$\forall m \in M, y \geq \sum_{v \in V} X_v^m * t_v * C_v \quad (3)$$

where $X^m_v$ is a binary variable that is set if the v-th VIP shard 14 is assigned to the m-th MUX 408; K is the number of MUXes 408 to be assigned to each VIP shard 14; M is the set of MUXes 408; V is the set of VIP shards 14; $t_v$ is the total traffic on the v-th VIP shard 14; $C_v$ is CPU utilization for unit traffic of the VIP shard 14; $\text{Capacity}_m$ is the capacity of the m-th MUX, and y is the maximum CPU load on each MUX 408.

The controller 10 provides the VIP-MUX mapping 16 to the switches 406. The switches 406 use the VIP-MUX mapping 16 to send the VIP shards 14 to the subset of MUXes 408 associated with the VIP shards 14. VIPs are not assigned to all MUXes 408 in the datacenter 402, instead, the MUXes 408 receive VIP shards 14 depending on MUX capacity and VIP traffic. The MUXes 408 receive the VIP shards 14 and sends the traffic of the VIP shards 14 to the DIPs 410 (e.g., 410a, 410b, 410c). The weight for each VIP shard 14 on each MUX 408 is equal to "1" in the ECMP table at the switches 406. The traffic for each VIP shard 14 is split equally among the MUXes 408 assigned to each VIP shard 14, helping to reduce a size of the ECMP table.

By splitting the VIP range into VIP shards 14 and mapping the VIP shards 14 to MUXes 408 using the capacity of the MUXes 408, the controller 10 automatically provides capacity aware MUX selection for the Internet traffic 12 received at the datacenter 402.

In some implementations, the sources 404 within the datacenter 402 select the MUX 408 for each VIP shard 14 for intra-datacenter (DC) traffic depending on a performance of the MUX 408. Intra-DC traffic is traffic originating from virtual machines (VMs) within the datacenter 402 and reaching virtual machines (VMs) within the datacenter 402. Each source 404 collects the traffic usage 24 (e.g., the end-to-end latency) for each MUX 408 for each VIP shard 14 on a MUX 408. The latency for each MUX 408 is determined by measuring the time between sending a synchronize (SYN) and receiving a SYN-acknowledgment (ACK).

Each source 404 identifies the MUX 408 handling the VIP shard 14 for the intra-DC traffic using IP-to-IP encapsulation of the packet for the VIP shard 14. Each source 404 attaches to an outer header of the packet for the VIP shard 14 a destination address (the IP address of the MUX 408) and a source address of the packet (IP address of the source 404). The switches 406 forward the packet to the MUX 408 specified in the packet header as the destination address and the MUX 408 decapsulates the outer header of the packet for the VIP shard 14.

In some implementations, each source 404 maintains a round-trip-time (RTT) for each connection to obtain the latency for each MUX 408. Each source 404 starts a timer when sending the SYN packet of the connection. The SYN packet goes to the DIP 410 through the MUXes 408. The TCP mechanism allows the SYNs to respond immediately. As a result, the DIPs 410 send back the SYN-ACK to the sources 404. The source 404 measures the time between sending the SYN and receiving the SYN-ACK for determining the latency.

Each source 404 uses the traffic usage 24 to calculate a MUX score 22 for each VIP shard 14 on each MUX 408. One example of an algorithm that the sources 404 use to calculate a MUX score 22 is illustrate below in Algorithm 1.

---

Algorithm 1

---

1) Each source (s):
   For each VIP-shard (v):
      For each MUX (m):
         measures average latency across all DIPs (latency_{s,v,m})
2) Calculates the minimum latency across all MUXes (minL_{s,v})
3) Score calculated as: Score_{s,v,m} = minL_{s,v} / latency_{s,v,m}

---

Each source 404 measures the average latency across all DIPs 410a, 410b, 410c and calculates the minimum latency across all MUXes 408a, 408b. The MUX score 22 is calculated by dividing the minimum latency across all MUXes 408a, 408 by the average latency across all DIPs 410a, 410b, 410c. Each source 404 calculates the MUX score 22 for each VIP shard 14 on each MUX 408. For example, source 404a calculates a MUX score 22 of 100 for a VIP1 shard on MUX 408a and a MUX score 22 of 90 for a VIP1 shard on MUX 408b. The MUX score 22 is calculated based on the relative latency of the MUXes 408. Different sources 404 may have different MUX scores 22 for a MUX 408.

Each source 404 provides the traffic usage 24 observed for each MUX 408 and the MUX score 22 calculated for each MUX 408 to the controller 10. The controller 10 calculates MUX weights 20 for each MUX 408 using the traffic usage 24 and the MUX score 22. The MUX weights 20 are calculated by the controller 10 based on a latency of the MUX 408. For intra-DC traffic, latency matters for application performance. The application performance depends on the end-to-end latency from the source 404 to the MUX 408 to the DIP 410 back to the source 404.

In some implementations, the controller 10 uses an integer linear program (ILP) for calculating the MUX weights 20. An objective of an example integer linear program that the controller 10 uses to calculate the MUX weights 20 is illustrated below in the equation (4). The objective of the integer linear program is to maximize a total score of the MUX 408. Constraints for the integer linear program that the controller 10 uses for calculating the MUX weights 20 are illustrated below in equations (5) and (6). The constraints include that the total weight from each source 404 across all MUXes 408 is 1 (equation (5)), and that the total traffic to each MUX 408 for the VIP shards 14 on each MUX 408 is under a capacity of the MUX 408 (equation (6)).

$$\sum_{s \in S} \sum_{v \in V} \sum_{m \in M} W_{s,m}^v * t_{s,m}^v * \text{Score}_{s,m}^v \quad (4)$$

$$\forall s \in S, \forall v \in V \sum_{m \in M} w_{s,m}^v = 1 \quad (5)$$

$$\forall m \in M, \forall v \in V \sum_{s \in S} w_{s,m}^v * t_{s,m}^v \le T_m^v \quad (6)$$

where $w_{s,m}^v$ is a variable between "0" and "1" that specifies a weight for the m-th MUX 408 at the s-th source 404 for the v-th VIP shard 14; M is the set of MUXes 408, V is the set of VIP shards 14, S is the set of sources 404, $t_{s,m}^v$ is the traffic from the s-th source 404 to the v-th VIP shard 14 via the m-th MUX 408, $\text{Score}_{s,m}^v$ is the score (out of 100) for the m-th MUX 408 at the s-th source 404 for the v-th VIP shard 14, and $T_m^v$ is the traffic capacity at the m-th MUX 408 for the v-th VIP shard 14.

The controller 10 sends the MUX weights 20 to the sources 404. Each source 404 uses the MUX weights 20 for selecting a MUX 408 for each VIP shard 14 to maximize a total score while load balancing the intra-DC traffic without exceeding a capacity of the MUX 408.

The environment 400 supports capacity away MUX 408 selection while preventing the ECMP table from increasing significantly (e.g., exploding a size of the ECMP table). The environment 400 reduces a size of the ECMP table compared to existing solutions for layer-4 LB. The environment 400 provides performance aware MUX 408 selection for sources 404 in a datacenter 402.

In some implementations, each of the components of the environment 400 is in communication with each other using any suitable communication technologies. In addition, while the components of the environment 400 are shown to be separate, any of the components or subcomponents may be combined into fewer components, such as into a single component, or divided into more components as may serve a particular implementation. In some implementations, the components of the environment 400 include hardware, software, or both. For example, the components of the environment 400 may include one or more instructions stored on a computer-readable storage medium and executable by processors of one or more computing devices. The processors may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. Memory is in electronic communication with the processors. The memory may be any electronic component capable of storing electronic information. For example, the memory may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof. When executed by the one or more processors, the computer-executable instructions of one or more computing devices can perform one or more methods described herein. In some implementations, the components of the environment 400 include hardware, such as a special purpose processing device to perform a certain function or group of functions. In some implementations, the components of the environment 400 include a combination of computer-executable instructions and hardware.

Figure 5:
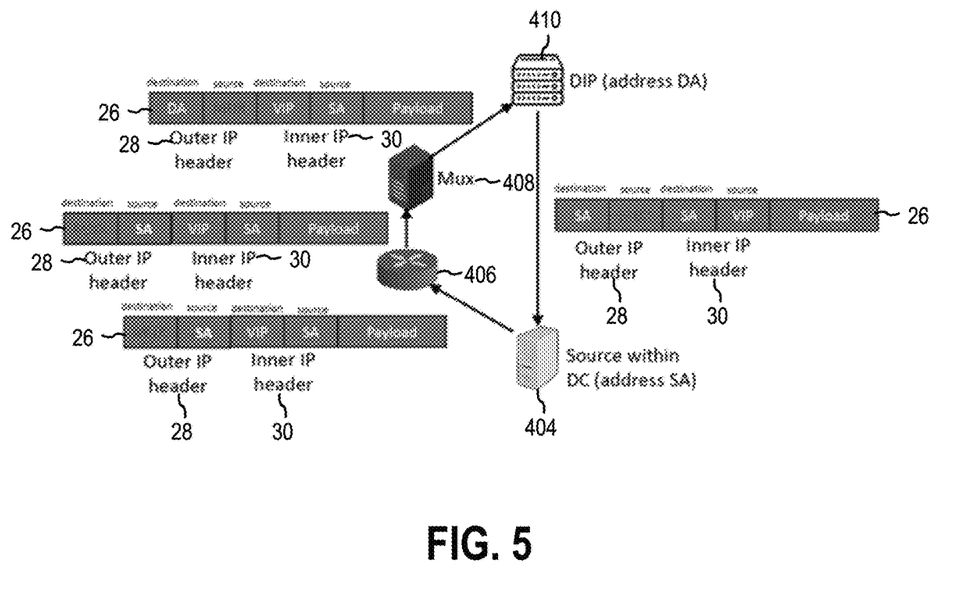
FIG. 5 illustrates an example packet structure for sending packets to MUXes for intra-datacenter (DC) traffic in accordance with implementations of the present disclosure.

FIG. 5 illustrates an example packet structure for sending packets to MUXes 408 for intra-datacenter (DC) traffic in a datacenter 402 (FIG. 4). FIG. 5 is discussed in reference to the architecture of FIG. 4.

The source 404 sends a packet 26 for a VIP shard 14 traffic to the switch 406 for the intra-DC traffic. The source 404 adds an outer IP header 28 and an inner IP header 30 to the packet 26. The outer IP header 28 includes a destination of the MUX 408 (MUX IP address) and an IP address of the source 404. The switch 406 forwards the packet 26 to the MUX 408 identified with the MUX IP address in the outer IP header 28.

The MUX 408 encodes the MUX IP address as the source in the outer IP header 28 and the IP address of the DIP 410 as the destination in the outer IP header 28 and sends the packet 26 to the DIP 410.

The DIP 410 encapsulates the packets 26 using IP-in-IP encapsulation. The DIP 410 writes the MUX IP address as the source in the outer IP header 28 of the packet 26 and the IP address of the source 404 as the destination address. The packets 26 include two headers (the outer IP header 28 and the inner IP header 30) from the DIPs 410. Existing layer-4 LBs do not include two headers in the packets 26 from the DIPs 410. By using two headers (the outer IP header 28 and the inner IP header 30) from the DIPs 410, the sources 404 can identify the MUX 408 that handled the traffic for the packet 26.

The sources 404 receives the packet 26 from the DIPs 410 and the sources 404 uses the MUX IP address in the outer IP header 28 to identify the MUX 408 that handled the traffic for the packet 26. The sources 404 use the identity of the MUX 408 that handled the traffic for the packet 26 to determine an end-to-end performance of the MUX 408 and a latency of the MUX 408.

Figure 6:
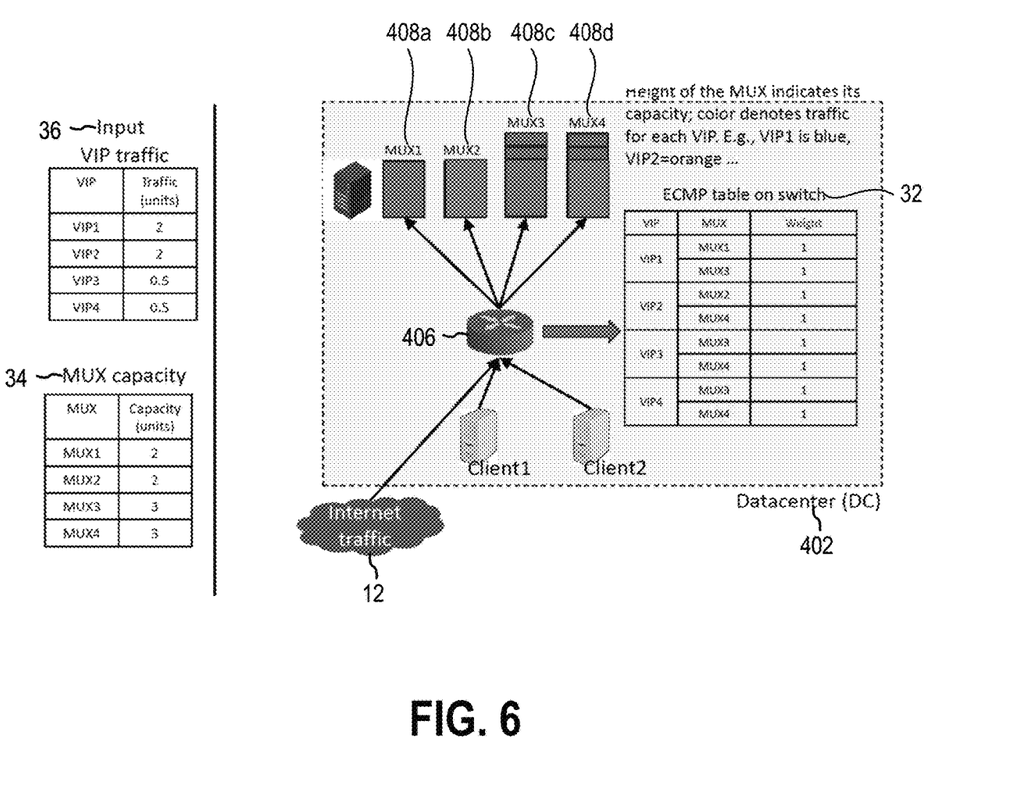
FIG. 6 illustrates an example of MUX selection for Internet traffic in a datacenter in accordance with implementations of the present disclosure.

FIG. 6 illustrates an example of MUX selection for Internet traffic 12 in datacenter 402. FIG. 6 is discussed below in reference to the architecture of FIG. 4. The height of the MUXes 408a, 408b, 408c, 408d indicates a MUX capacity 34. For example, the MUX1 (MUX 408a) capacity is two units, the MUX2 (MUX 408b) capacity is two units, the MUX3 (MUX 408c) capacity is three units, and the MUX4 (MUX 408d) capacity is three units. In some implementations, the units are packets per second. For example, MUX1 (MUX 408a) can process 200K packets/second (200 thousand packets per second) and MUX3 (MUX 408c) can process 300K packets/second (300 thousand packets per second).

The input VIP traffic 36 (in this illustrated example, the Internet traffic 12) is divided into four VIP shards 14 (VIP1 shard, VIP2 shard, VIP3 shard, VIP4 shard). For example, the traffic for VIP1 is two units, the traffic for VIP2 is two units, the traffic for VIP3 is half a unit, and the traffic for VIP4 is half a unit. In some implementations, the units are packets per second of the VIP shard 14 traffic. The input VIP traffic 36 for each VIP is monitored at all MUXes 408 and the amount of traffic for each VIP is determined in response to the input VIP traffic 36 monitoring. For example, the traffic for VIP1 is 100K packets/second (100 thousand packets per second) and the traffic for VIP2 is 200K packets/second (200 thousand packets per second).

The controller 10 assigns the VIP shards 14 to the different MUXes 408a, 408b, 408c, 408d based on the MUX capacity 34 and the traffic for the VIP shards 14. In some implementations, the controller 10 uses an ILP with the constraints of the ILP illustrated in equations (1), (2), and (3) to determine the VIP shard 14 assignments to the different MUXes 408a, 408b, 408c, 408d.

For example, the controller 10 assigns the VIP1 shard to MUX1 (MUX 408a) and MUX3 (408c). The controller assigns the VIP2 shard to MUX2 (MUX 408b) and MUX4 (MUX 408d). The controller assigns the VIP3 shard to MUX3 (MUX 408c) and MUX4 (MUX 408d). The controller assigns the VIP4 shard to MUX3 (MUX 408c) and MUX4 (MUX 408d). Different shadings of the MUXes 408a, 408b, 408c, 408d correspond to different VIP shards 14 assigned to the MUXes 408a, 408b, 408c, 408d.

The ECMP table 32 on the switch 406 includes the VIP shards 14 and the corresponding MUX 408 assignments for the VIP shards 14. The switches 406 use the ECMP table 32 to determine where to send the VIP shard 14 traffic. For example, the switch 406 sends the traffic for VIP1 shard to MUX1 (MUX 408a) and (408c), sends the traffic for VIP2 shard to MUX2 (MUX 408b) and MUX4 (MUX 408d), sends the traffic for VIP3 shard to MUX3 (MUX 408c) and MUX4 (MUX 408d), and sends the traffic for VIP4 shard to MUX3 (MUX 408c) and MUX4 (MUX 408d).

The ECMP table 32 also includes a weight for each of the MUXes 408a, 408b, 408c, 408d. The weight for each VIP shard 14 on each MUX 408 is equal to "1." The traffic for each VIP shard 14 is split equally by the switches 406 among the MUXes 408 in the subset assigned to each VIP shard 14, helping to reduce a size of the ECMP table 32. The size of the illustrated ECMP table 32 is eight. The VIP shard 14 traffic is assigned to the MUXes 408a, 408b, 408c, 408d based on the VIP shard 14 traffic and the MUX capacity 34.

Figure 7:
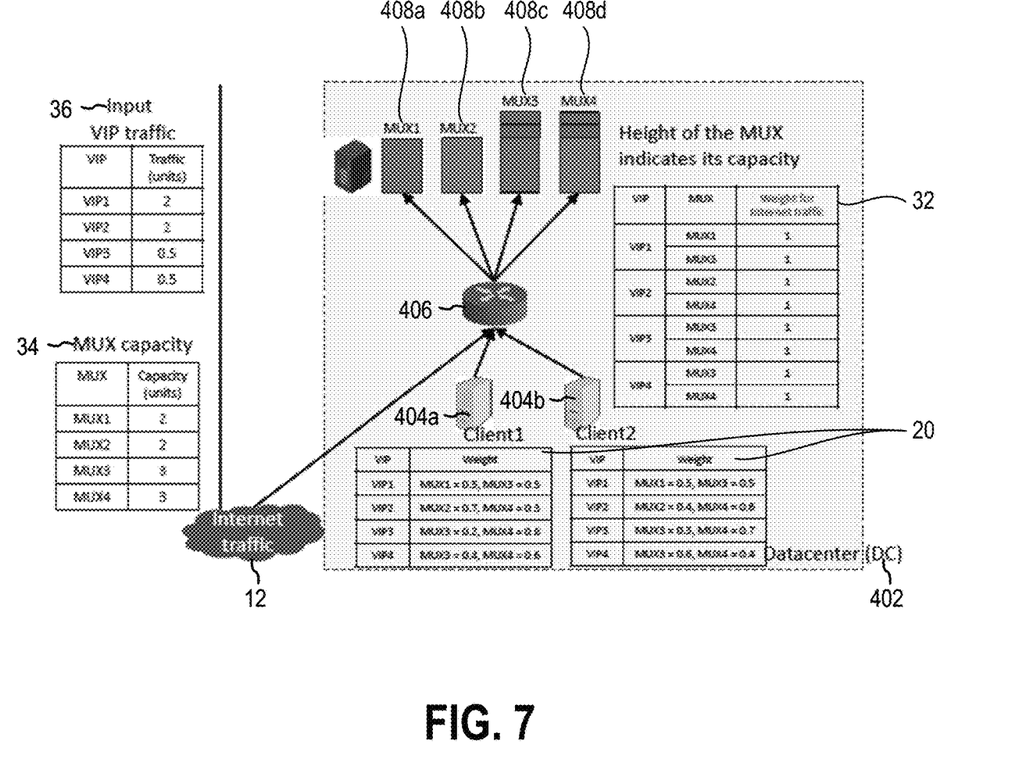
FIG. 7 illustrates an example of MUX selection for Internet traffic and intra-DC traffic in a datacenter in accordance with implementations of the present disclosure.

Referring now to FIG. 7, illustrated is an example of MUX selection for the Internet traffic 12 and intra-DC traffic in a datacenter 402. FIG. 7 is discussed below in reference to the architectures of FIGS. 4-6. The height of the MUXes 408a, 408b, 408c, 408d indicates a MUX capacity 34. For example, the MUX1 (MUX 408a) capacity is two units, the MUX2 (MUX 408b) capacity is two units, the MUX3 (MUX 408c) capacity is three units, and the MUX4 (MUX 408d) capacity is three units.

The input VIP traffic 36 in this illustrated example includes the Internet traffic 12 and intra-DC traffic. The input VIP traffic 36 is divided into four VIP shards 14 (VIP1 shard, VIP2 shard, VIP3 shard, VIP4 shard). For example, the traffic for VIP1 is two units, the traffic for VIP2 is two units, the traffic for VIP3 is half a unit, and the traffic for VIP4 is half a unit.

For the Internet traffic 12 received at the datacenter 402, the Internet traffic 12 is received directly by the switches 406, and the switches 406 use the VIP-MUX mapping 16 from the controller 10 in the ECMP table 32 to handle the Internet traffic 12, as discussed in FIG. 6. For intra-DC traffic, the controller 10 sends the MUX weights 20 to clients (sources 404a, 404b) and the clients (sources 404a, 404b) select the MUXes 408a, 408b, 408c, 408d using the MUX weights 20 to maximize performance of the intra-DC traffic.

In some implementations, the controller determines the MUX weights 20 using the ILP (discussed in reference to equations (4), (5), and (6)) and sends the MUX weights 20 to the clients (sources 404a, 404b). The MUX weights 20 are calculated by the controller 10 without violating the MUX capacity 34. The clients (sources 404a, 404b) use the MUX weights 20 to select which MUX 408a, 408b, 408c, 408d to assign to the VIP shard intra-DC traffic. The MUX weights 20 are also used by the clients (sources 404a, 404b) to determine an amount of the VIP shard 14 traffic to send to the MUXes 408a, 408b, 408c, 408d.

In the illustrated example, the client1 (source 404a) splits the intra-DC traffic for the VIP1 shard equally between the MUX1 (MUX 408a) and the MUX3 (408c). For example, the MUX weight 20 for MUX1 is equal to 0.5 and 50% of the VIP1 shard intra-DC traffic from client1 (source 404a) is sent to MUX1 and the MUX weight 20 for MUX2 is equal to 0.5 and 50% of the VIP1 shard intra-DC traffic is sent to MUX2. The client1 (source 404a) sends more of the traffic for the VIP2 shard to MUX2 (MUX 408b) as compared to the traffic for the VIP2 shard sent to MUX4 (MUX 408d). For example, the MUX weight 20 for MUX2 for the VIP2 shard traffic is equal to 0.7 and 70% of the VIP2 shard intra-DC traffic is sent to MUX2 and the MUX weight 20 for MUX4 for the VIP2 shard traffic is equal to 0.3 and 30% of the VIP2 shard intra-DC traffic is sent to MUX4. The client1 (source 404a) sends more of the traffic for the VIP3 shard to MUX4 (MUX 408d) as compared to MUX3 (MUX 408c). For example, the MUX weight 20 for MUX4 for the VIP3 shard traffic is equal to 0.8 and 80% of the VIP3 shard intra-DC traffic is sent to MUX4 and the MUX weight 20 for MUX3 for the VIP3 shard traffic is equal to 0.2 and 20% of the VIP3 shard intra-DC traffic is sent to MUX3. The client1 (source 404a) sends more of the traffic for the VIP4 shard to MUX4 (MUX 408d) as compared to MUX3 (MUX 408c). For example, the MUX weight 20 for MUX4 for the VIP4 shard traffic is equal to 0.6 and 60% of the VIP4 shard intra-DC traffic is sent to MUX4 and the MUX weight 20 for MUX3 for the VIP4 shard traffic is equal to 0.4 and 40% of the VIP3 shard intra-DC traffic is sent to MUX3.

In the illustrated example, the client2 (source 404b) splits the intra-DC traffic for the VIP1 shard equally between the MUX1 (MUX 408a) and the MUX3 (408c). For example, the MUX weight 20 for MUX1 is equal to 0.5 and 50% of the VIP1 shard intra-DC traffic is sent to MUX1 and the MUX weight 20 for MUX2 is equal to 0.5 and 50% of the VIP1 shard intra-DC traffic is sent to MUX2. The client2 (source 404b) sends more of the traffic for the VIP2 shard to MUX4 (MUX 408d) as compared to the traffic for the VIP2 shard sent to MUX2 (MUX 408b). For example, the MUX weight 20 for MUX4 for the VIP2 shard traffic is equal to 0.6 and 60% of the VIP2 shard intra-DC traffic is sent to MUX4 and the MUX weight 20 for MUX2 for the VIP2 shard traffic is equal to 0.4 and 40% of the VIP2 shard intra-DC traffic is sent to MUX2. The client2 (source 404b) sends more of the traffic for the VIP3 shard to MUX4 (MUX 408*d*) as compared to MUX3 (MUX 408*c*). For example, the MUX weight 20 for MUX4 for the VIP3 shard traffic is equal to 0.7 and 70% of the VIP3 shard intra-DC traffic is sent to MUX4 and the MUX weight 20 for MUX3 for the VIP3 shard traffic is equal to 0.3 and 30% of the VIP3 shard intra-DC traffic is sent to MUX3. The client2 (source 404*b*) sends more of the traffic for the VIP4 shard to MUX3 (MUX 408*c*) as compared to MUX4 (MUX 408*d*). For example, the MUX weight 20 for MUX3 for the VIP4 shard traffic is equal to 0.6 and 60% of the VIP4 shard intra-DC traffic is sent to MUX3 and the MUX weight 20 for MUX4 for the VIP4 shard traffic is equal to 0.4 and 40% of the VIP3 shard intra-DC traffic is sent to MUX4.

Each client (sources 404*a*, 404*b*) may have different MUX weights 20 for the VIP shards 14. In addition, each client (sources 404*a*, 404*b*) may have different weights for each MUX 408*a*, 408*b*, 408*c*, 408*d* for different VIP shards 14.

The clients (sources 404*a*, 404*b*) use the MUX weights 20 to assign the selected MUX 408*a*, 408*b*, 408*c*, 408*d* as the destination IP address in the packet 26 outer IP header 28. For example, client1 (source 404*a*) assigns 70% of the packets 26 for the VIP2 shard traffic with the IP address for MUX2 (MUX 408*b*) in the destination address in the outer IP header 28 and assigns 30% of the packets 26 for the VIP2 shard traffic with the IP address for MUX4 (MUX 408*d*) in the destination address in the outer IP header 28.

The packets 26 from the clients (sources 404*a*, 404*b*) within the datacenter 402 are forwarded by the switches 406 to the MUXes 408*a*, 408*b*, 408*c*, 408*d* identified in the destination addresses in the outer IP header 28 of the packets 26 by the clients (sources 404*a*, 404*b*).

The clients (sources 404*a*, 404*b*) use the MUX weights 20 to send the packets 26 to specific MUXes 408*a*, 408*b*, 408*c*, 408*d* based on performance (end-to-end) latency of the MUXes 408*a*, 408*b*, 408*c*, 408*d*.

Figure 8:
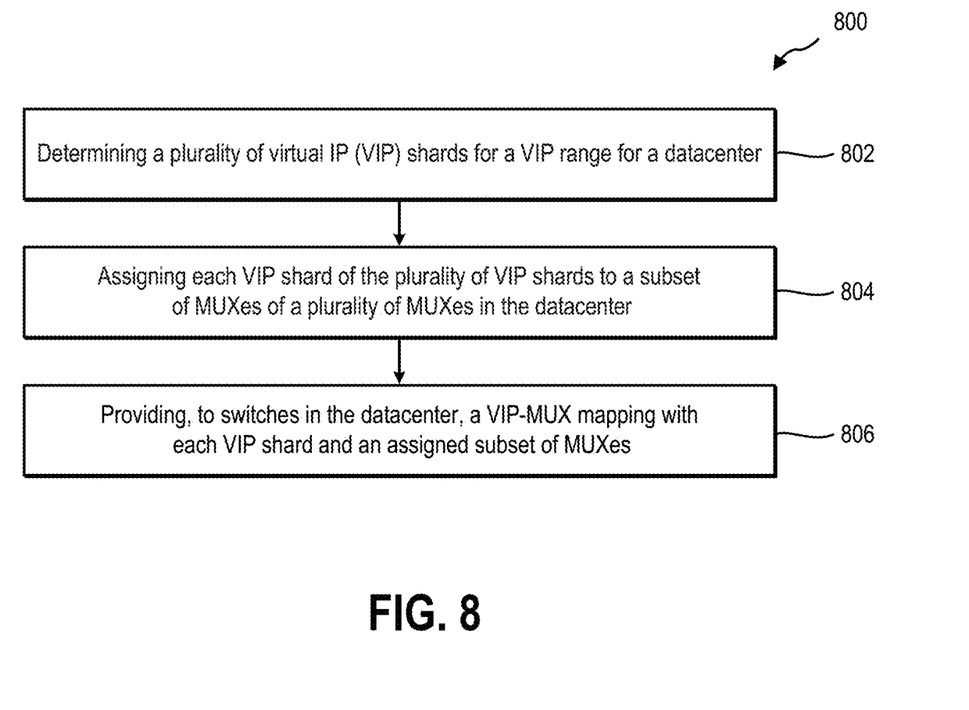
FIG. 8 illustrates an example method for MUX selection in accordance with implementations of the present disclosure.

FIG. 8 illustrates an example method 800 for MUX selection. The actions of the method 800 are discussed below with reference to FIGS. 1-7.

At 802, the method 800 includes determining a plurality of virtual IP (VIP) shards for a VIP range for a datacenter. The controller 10 determines a plurality of VIP shards 14 for a VIP range for the datacenter 402. Each VIP shard 14 is a subset of the VIP range for the datacenter 402.

At 804, the method 800 includes assigning each VIP shard of the plurality of VIP shards to a subset of MUXes of a plurality of MUXes in the datacenter. The controller 10 assigns each VIP shard 14 to a subset of MUXes 408 in the datacenter 402.

In some implementations, the controller 10 determines a MUX capacity 34 of each MUX 408 and assigns each VIP shard 14 to the subset of MUXes 408 based on the MUX capacity 34 and traffic for each VIP shard 14. In some implementations, the MUX capacity 34 is determined based on receiving a CPU usage 18 from each MUX 408 and using the CPU usage 18 to determine an available amount of the MUX capacity 34. The traffic for each VIP shard 14 assigned to a MUX 408 is under the MUX capacity 34 of the MUX 408 (e.g., within the available amount of the MUX capacity 34). In some implementations, the controller 10 uses an ILP (e.g., the ILP discussed with the constraints illustrated in equations (1), (2), and (3)) to assign each VIP shard 14 to the subset of MUXes 408 based on the MUX capacity 34. The ILP minimizes a maximum CPU usage on each MUX 408.

In some implementations, the controller 10 receives a MUX score 22 for each MUX 408 of the plurality of MUXes in a datacenter 402. The controller 10 uses an ILP (e.g., as discussed in equation 2) to calculate a MUX weight 20 for each VIP shard 14 on each MUX 408 based on the MUX score 22. The controller 10 sends the MUX weight 20 for each VIP shard 14 on each MUX 408 to the sources 404 in the datacenter 402. In some implementations, the MUX score 22 is calculated for each VIP shard 14 on each MUX 408 based on a latency of each MUX 408. The sources 404 use the MUX weights 20 to distribute intra-datacenter traffic for each VIP shard 14 on each MUX 408 based on a performance of the MUXes 408.

At 806, the method 800 includes providing, to switches in the datacenter, a VIP-MUX mapping with each VIP shard and an assigned subset of MUXes. The controller 10 provides a VIP-MUX mapping 16 with each VIP shard 14 and the assigned subset of MUXes 408 to the switches 406 in the datacenter 402. In some implementations, the VIP-MUX mapping 16 is stored, at the switches, in an equal-cost-multi-path (ECMP) table 32. The size of the ECMP table 32 is equal to a number of VIP shards 14 multiplied by a number of MUXes in the subset of MUXes 408. The switches 406 use the VIP-MUX mapping 16 to send the traffic for a VIP shard 14 to a corresponding MUX to handle the traffic for the VIP shard 14.

The method 800 provides capacity aware MUX selection in a datacenter for handling traffic for the datacenter. The method 800 also provides performance aware MUX selection for intra-datacenter traffic.

Figure 9:
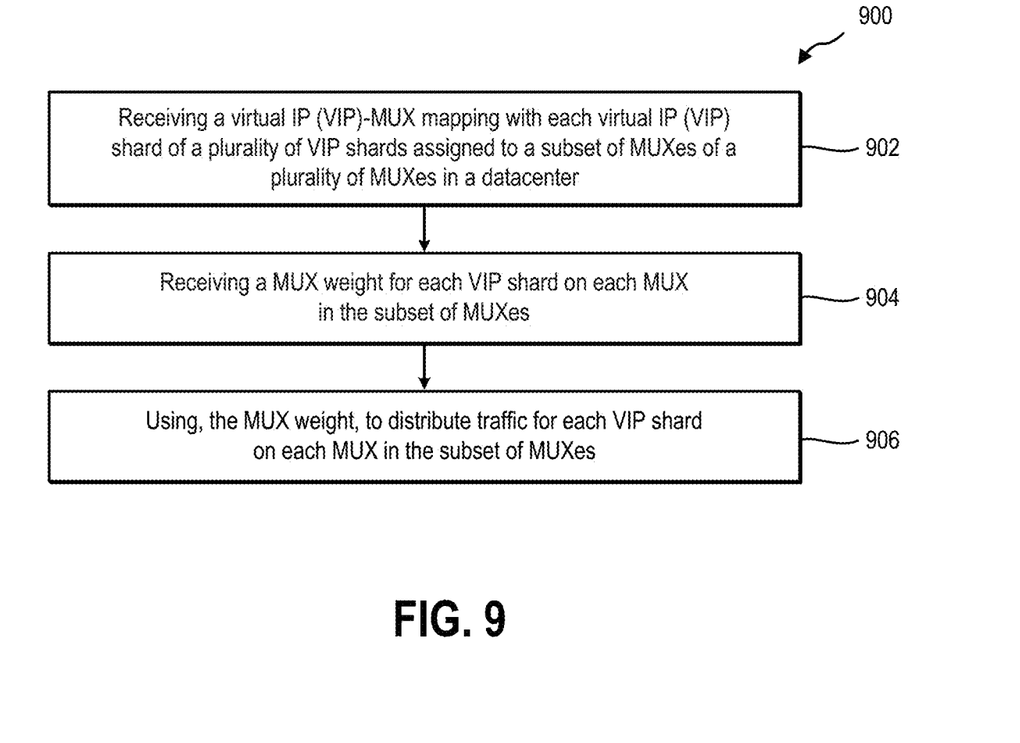
FIG. 9 illustrates an example method for performance aware MUX selection in accordance with implementations of the present disclosure.

FIG. 9 illustrates an example method 900 for performance aware MUX selection. The actions of the method 900 are discussed below with reference to FIGS. 1-7.

At 902, the method 900 includes receiving, from a controller, a virtual IP (VIP)-MUX mapping with each virtual IP (VIP) shard of a plurality of VIP shards assigned to a subset of MUXes of a plurality of MUXes in a datacenter. Each source 404 in the datacenter 402 receives from the controller 10 a VIP-MUX mapping 16 with each VIP shard 14 assigned to a subset of MUXes 408 in the datacenter 402. Each VIP shard 14 is a subset of the VIP range for the datacenter 402.

At 904, the method 900 includes receiving, from the controller, a MUX weight for each VIP shard on each MUX in the subset of MUXes. Each source 404 receives from the controller 10 the MUX weights 20 for each VIP shard 14 and each MUX 408. In some implementations, each source 404 determines a MUX score 22 for each VIP shard 14 on each MUX 408 based on a latency of each MUX 408. The latency of each MUX 408 is determined by each source 404 observing a round-trip-time of connections on each MUX 408 by using a start time for sending a packet 26 to the MUX 408 for traffic of a VIP shard 14 and an end time for receiving the packet 26 from the MUX 408. In some implementations, the round-trip-time is determined by the sources 404 identifying a source IP address of a MUX 408 that transmitted the packet 26 in an outer internet protocol (IP) header 28 in the packet 26.

Each source 404 sends the MUX score 22 for each VIP shard 14 on each MUX 408 to the controller 10. In some implementations, different MUXes 408 have different MUX scores 22 for a same VIP shard 14. The controller 10 uses the MUX score 22 to determine the MUX weight 20.

Each source 404 receives from the controller 10 a MUX weight 20 for each VIP shard 14 on each MUX 408. In some implementations, different sources 404 in the datacenter 402 have different MUX weights 20 for each VIP shard 14 on each MUX 408.

At 906, the method 900 includes using, the MUX weight, to distribute traffic for each VIP shard on each MUX in the subset of MUXes. The traffic is intra-datacenter traffic. Each source 404 uses the MUX weight 20 to determine a portion of traffic for each VIP shard 14 to distribute to each MUX 408 in the subset of MUXes assigned to a VIP shard 14. Each source 404 uses an outer IP header 28 of packets 26 for the traffic of the VIP shard 14 to assign a source IP address of the MUX 408 to receive the packets 26. Each source 404 sends the packets 26 to a switch 406 in the datacenter 402 and the switch 406 sends the packets 26 to the IP address of the MUX 408 identified in the outer IP header 28 of the packets 26.

The method 900 provides performance aware MUX selection for intra-datacenter traffic. The method 900 also allows sources 404 in the datacenter to select which MUXes 408 receive the intra-DC traffic.

As illustrated in the foregoing discussion, the present disclosure utilizes a variety of terms to describe features and advantages of the methods and systems. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   determining a plurality of virtual IP (VIP) shards for a VIP range for a datacenter, wherein each VIP shard is a subset of the VIP range;
   assigning each VIP shard of the plurality of VIP shards to a subset of multiplexers (MUXes) of a plurality of MUXes in the datacenter;
   providing, to switches in the datacenter, a VIP-MUX mapping with each VIP shard and an assigned subset of MUXes;
   receiving a MUX score for each MUX of the plurality of MUXes;
   using an integer linear program (ILP) to calculate a MUX weight for each VIP shard on each MUX based on the MUX score; and
   sending, to sources in the datacenter, the MUX weight for each VIP shard on each MUX.

2. The method of claim 1, further comprising:
   determining a MUX capacity of each MUX of the plurality of MUXes in the datacenter; and
   assigning each VIP shard to the subset of MUXes based on the MUX capacity and traffic for each VIP shard.

3. The method of claim 2, wherein the traffic for each VIP shard assigned to a MUX is under the MUX capacity for the MUX.

4. The method of claim 2, wherein determining the MUX capacity further includes receiving a central processing unit (CPU) usage from each MUX and using the CPU usage to determine an available amount of the MUX capacity.

5. The method of claim 2, further comprising:
   using an integer linear program (ILP) to assign each VIP shard to the subset of MUXes based on the MUX capacity, wherein the integer linear program minimizes a maximum central processing unit (CPU) usage on each MUX of the plurality of MUXes.

6. The method of claim 2, wherein the traffic is Internet traffic, and the method further comprises:
   using, by the switches, the VIP-MUX mapping to send the traffic for a VIP shard to a corresponding MUX to handle the traffic for the VIP shard.

7. The method of claim 6, wherein the VIP-MUX mapping is stored, at the switches, in an equal-cost-multi-path (ECMP) table.

8. The method of claim 7, wherein a size of the ECMP table is equal to a number of VIP shards multiplied by a number of MUXes in the subset of MUXes.

9. The method of claim 1, wherein the MUX score is calculated for each VIP shard on each MUX based on a latency of each MUX.

10. The method of claim 1, further comprising:
    using, by the sources, the MUX weights to distribute traffic for each VIP shard on each MUX, wherein the traffic is intra-datacenter traffic.

11. A method, comprising:
    receiving, from a controller, a virtual IP (VIP)-MUX mapping with each virtual IP (VIP) shard of a plurality of VIP shards assigned to a subset of multiplexers (MUXes) of a plurality of MUXes in a datacenter, wherein each VIP shard is a subset of a VIP range for the datacenter;
    receiving, from the controller, a MUX weight for each VIP shard on each MUX in the subset of MUXes; and
    using, the MUX weight, to distribute traffic for each VIP shard on each MUX in the subset of MUXes.

12. The method of claim 11, further comprising:
    determining a MUX score for each VIP shard on each MUX in the subset of MUXes based on a latency of each MUX; and
    sending, to the controller, the MUX score for each VIP shard on each MUX, wherein the controller uses the MUX score to determine the MUX weight.

13. The method of claim 12, wherein the latency of each MUX is determined by observing a round-trip-time of connections on each MUX by using a start time for sending a packet to a MUX for traffic of a VIP shard and an end time for receiving the packet from the MUX.

14. The method of claim 13, wherein the round-trip-time is determined by identifying a source IP address of a MUX that transmitted the packet in an outer internet protocol (IP) header in the packet.

15. The method of claim 11, further comprising:
    determining, using the MUX weight, a portion of traffic for each VIP shard to distribute to each MUX in the subset of MUXes assigned to each VIP shard.

16. The method of claim 15, further comprising:
    using an outer internet protocol (IP) header of packets for the traffic to assign a source IP address of a MUX to receive the packets; and
    sending the packets to a switch in the datacenter and the switch sends the packets to the IP address of the MUX identified in the outer IP header of the packets.

17. The method of claim 11, wherein different MUXes have different MUX scores for a VIP shard.

18. The method of claim 11, wherein different sources in the datacenter have different MUX weights for each VIP shard on each MUX.

19. The method of claim 11, wherein the traffic is intra-datacenter traffic.

* * * * *